United States Patent [19]
Thomas

[11] Patent Number: 5,055,239
[45] Date of Patent: Oct. 8, 1991

[54] LIQUID AND GAS CONTACT APPARATUS

[75] Inventor: Patricia T. Thomas, North Fort Myers, Fla.

[73] Assignee: Munters Corporation, Fort Myers, Fla.

[21] Appl. No.: 614,277

[22] Filed: Nov. 15, 1990

[51] Int. Cl.$^5$ .............................................. B01F 3/04
[52] U.S. Cl. ................................................. 261/112.2
[58] Field of Search ..................................... 261/112.2

[56] References Cited

U.S. PATENT DOCUMENTS

| | | | |
|---|---|---|---|
| 2,809,818 | 10/1957 | Munters | 261/112.2 |
| 3,052,105 | 9/1962 | Bowman et al. | 261/112.2 |
| 3,081,987 | 3/1963 | Meek et al. | 261/112.2 |
| 3,265,550 | 8/1966 | Lindqvist | 261/112.2 |
| 3,395,903 | 8/1968 | Norback et al. | 261/112.2 |
| 3,500,616 | 3/1970 | Meek | 261/112.2 |
| 3,792,841 | 2/1974 | Munters | 261/112.2 |

Primary Examiner—Tim Miles
Attorney, Agent, or Firm—Pasquale A. Razzano

[57] ABSTRACT

A gas and liquid contact body for use in a gas and liquid contact apparatus in which gas and liquid flow in cross flow relationship to one another is disclosed. The contact body is formed of a plurality of sheets of corrugated material having first and second opposed edges with corrugations formed in the sheets extending at an angle to the edges and abutting each other at points in adjacent sheets to form through-passing channels for gas and liquid. The first and second edges of the sheets define gas inlet and outlet edges in the contact body. Either the gas inlet edge or the gas outlet edge, or both, have a plurality of generally channel shaped notches formed therein so that liquid flowing through the contact body will agglomerate at the notches. The agglomerated liquid will flow downwardly along the gas inlet edge of the contact body to clean the sheet at that gas inlet edge.

22 Claims, 3 Drawing Sheets

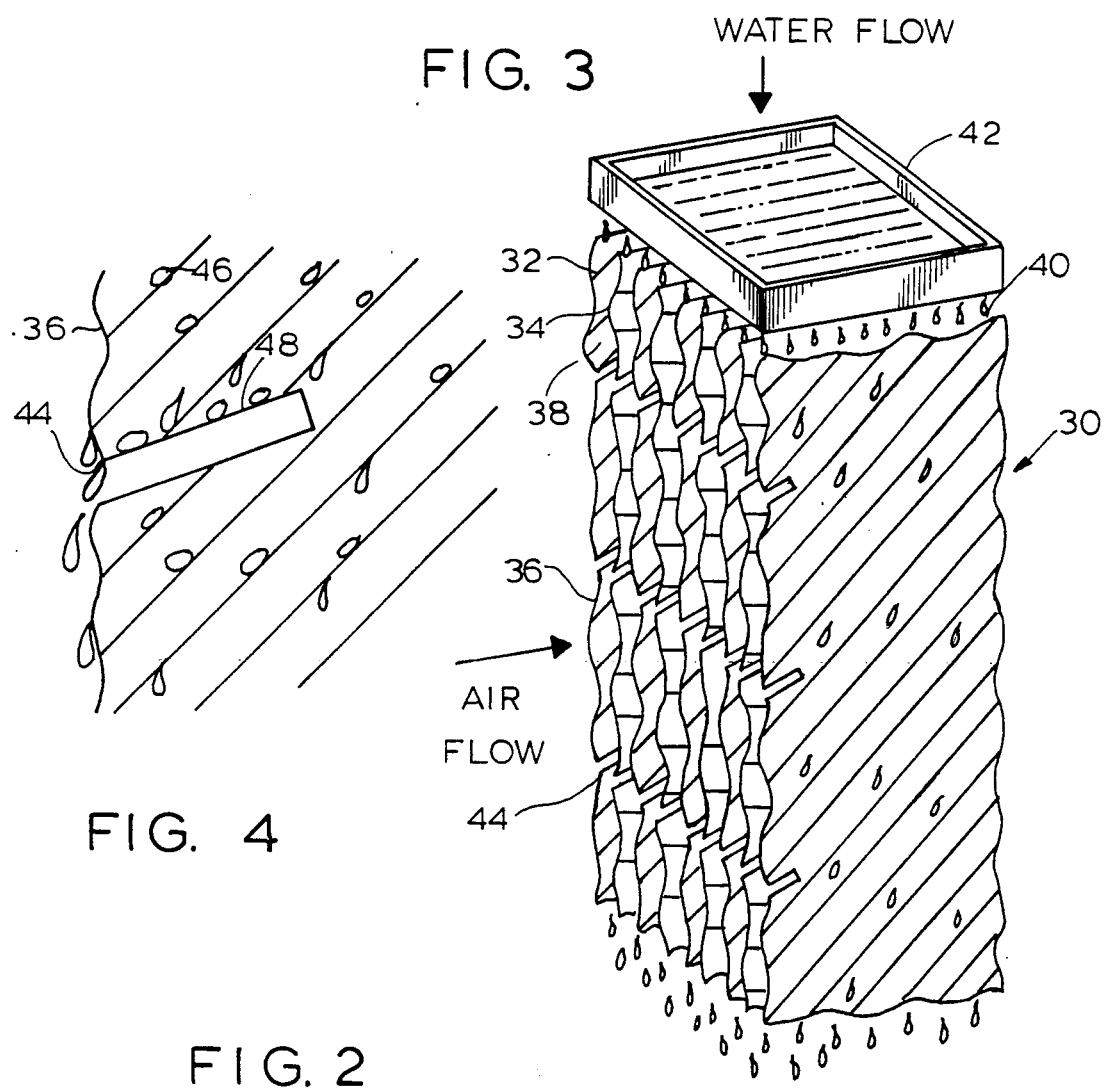
FIG. 3
WATER FLOW
FIG. 4
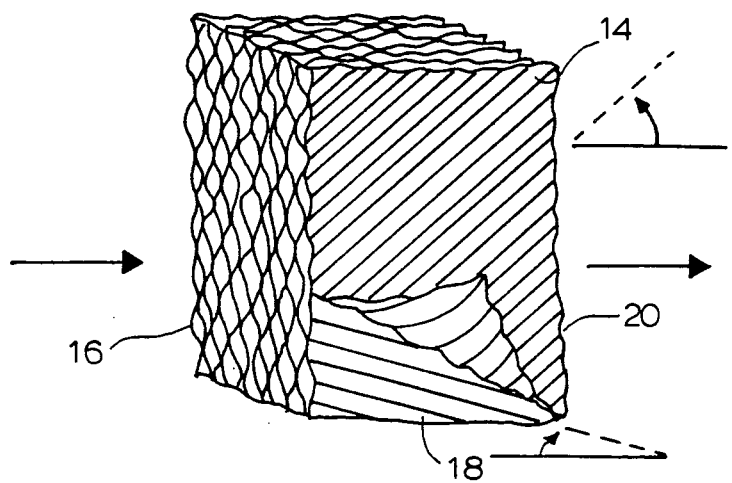
FIG. 2
PRIOR ART

LIQUID AND GAS CONTACT APPARATUS

The present invention relates to gas and liquid contact apparatus and more particularly to a self-cleaning gas and liquid contact body.

Air and liquid contact bodies for use in evaporative coolers, humidifiers, heat exchangers and air filters have been proposed in the past which permit crossflow of air and liquid in the body. These contact bodies have previously been constructed of cross corrugated sheets of material such as plastic, cellulose, paper and other kinds of materials, as are well known in the art. Such contact bodies are disclosed for example in U.S. Pat. No. 3,792,841; 3,395,903; and 3,500,615. These contact bodies, such as disclosed in U.S. Pat. No. 3,792,841 have been generally satisfactory in use and commercially successful. However, it has been found that where the gas being treated has suspended particles such as airborne dust or debris, and/or the liquid contains suspended solids, dissolved solids or minerals, the passages formed in the contact body by the corrugated sheets become clogged with deposited material. It has more particularly been found that deposition of suspended materials and clogging are most severe at the gas inlet side or edge of the contact body particularly along the first one-half to two inches of the body in the direction of gas flow. Often the remainder of the contact body (which may be up to 24 inches or more in depth) is relatively clean.

Clogging of the channels or passages in the contact body caused by the deposition of suspended solids or dust, etc., increases the pressure drop across the contact body and decreases its ability to operate.

The prior art has proposed a number of different possible solutions to this problem, each of which has its own problems and none of which have been found to be entirely satisfactory.

One method of overcoming the clogging problem inherent in gas and liquid contact bodies of the type involved in the present invention has been to provide an unequal angle in adjacent sheets of the corrugated contact media. This solution, described in U.S. Pat. No. 3,792,841, consists of providing alternate corrugated sheets in the contact body with a steeper angle directed towards the gas entering side of the body than the angle of the other sheets in the contact body, which slope down towards the gas outlet side. This arrangement, as shown for example in FIG. 2, directs more of the liquid flowing downwardly in the contact body to the gas inlet side of the body so that more liquid is present along the gas inlet side to cleanse the surfaces of the sheet material along the inlet side. This construction has been found to work very well with applications using clean air, clean gas and liquid, but clogging still occurs when dirty gas or liquid is used.

Another method of counteracting the deposition of solids, as well as the migration of liquid under gas flow toward the gas outlet side of the contact body, is to lean the top of the media into the gas flow stream, as shown for example in FIG. 1B. This arrangement is more costly to construct and will cause some of the liquid to fall away from the contact media without travelling down the entire inlet edge of the contact body.

Yet another method of cleansing the gas inlet face of contact body media is to clean the gas inlet face of the media with a liquid spray, as shown for example in FIG. 1C. This solution has its own problems in that the liquid sprayed to clean the media can pass entirely through the media with the gas and cause problems downstream in the gas handling system. Moreover, it has been found that the gas inlet face of the media can be eroded by repetitive spraying under pressure.

A still further method of removing deposits from gas liquid contact media is to incorporate a liquid flushing cycle every 24 hours to try to cleanse the channels of the contact media. This solution requires the contact body to be flooded with liquid for a period of time where no gas flow is passing therethrough. This solution is not entirely satisfactory because it means the gas handling system must be shut down and complex and expensive controls are required for the flooding operation.

It is an object of the present invention to provide and improve gas liquid contact body which has a self-cleansing action.

Another object of the present invention is to provide an improved gas liquid contact apparatus of the type described.

A still further object of the present invention is to provide a self-cleansing gas liquid contact body which is relatively simple to manufacture.

In accordance with an aspect of the present invention a gas and liquid contact body for use in a gas and liquid contact apparatus in which gas and liquid flow in cross flow relationship to one another is provided in which the contact body is formed of first and second sets of corrugated sheets having corrugations formed therein which are disposed in a direction transversely of the horizontal plane of the contact body. The sheets of the first set are disposed alternately with the sheets of the second set, with the corrugations of the first set crossing the corrugations of the second set. The contact body has a gas inlet edge and a gas outlet edge defined by the opposite edges of the sheets in the two sets. The crossed corrugations of the sheets define passageways penetrating from the gas inlet edge to the gas outlet edge of the body. At least one of the gas inlet edges and/or the gas outlet edge is provided with a plurality of generally channel shaped notches formed therein so that liquid flowing through the contact body along the corrugations toward the edge of the contact body having the notches formed therein will agglomerate at the notches. Where the notches are formed in the gas inlet side of the contact body the agglomerated liquid will flow down along the gas inlet edge and cleanse the surfaces of the corrugated sheets. Where the notches are formed in the gas outlet edge of the contact body the liquid will agglomerate along the notches and flow away from the gas outlet edge toward the gas inlet edge and again cleanse the gas inlet edge of the contact body.

The above, and other objects, features and advantages of the present invention will be apparent from the following detailed description of illustrative embodiments thereof when considered in connection with the accompanying drawings wherein.

Figure 5:
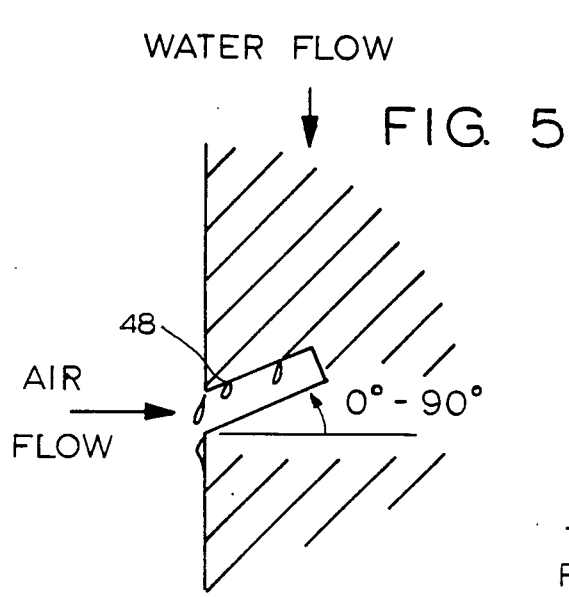
Figure 6:
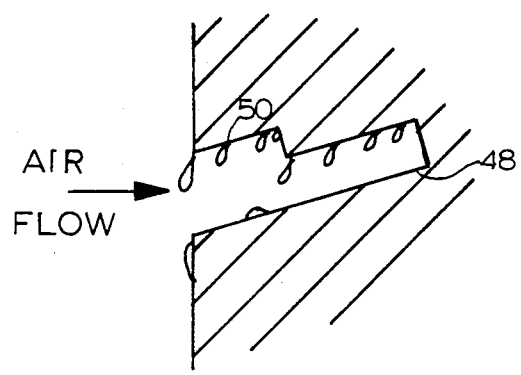
Figure 8:
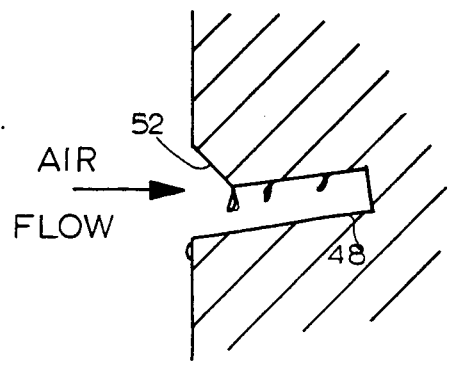
Figure 7:
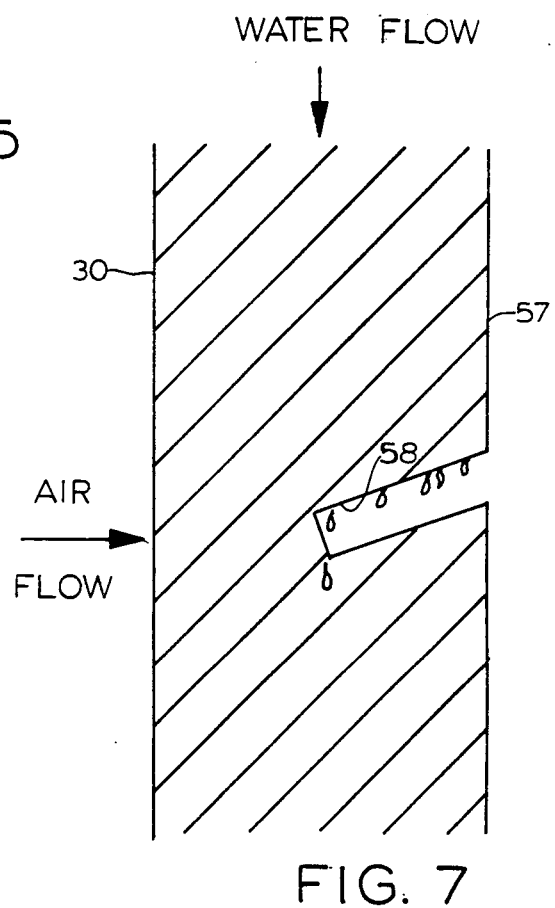
Figure 9:
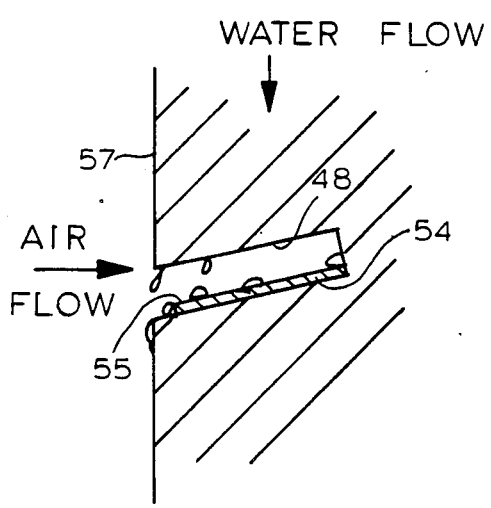

FIG. 2 is a slightly enlarged perspective view of a segment of a conventional gas liquid contact body made in accordance with the disclosure in U.S. Pat. No. 3,792,841;

FIG. 3 is a perspective view of a gas liquid contact body made in accordance with the present invention;

FIG. 4 is an enlarged partial side view of a notched portion of the gas inlet side of the gas liquid contact body of FIG. 3;

FIG. 5 is schematic side view, similar to FIG. 4 of a notched section of the gas liquid contact body of the present invention;

FIG. 6 is a schematic side view, similar to FIG. 5 of another embodiment of the invention;

FIG. 7 is a schematic side view similar to FIG. 5, showing the notches formed on the gas outlet side or edge of the contact body;

FIG. 8 is a side view similar to FIG. 5 of yet another embodiment of the present invention; and FIG. 9 is a schematic side view similar to FIG. 5 showing yet another embodiment of the present invention using a blocking plate in the lower surface of the notch.

Figure 1C:
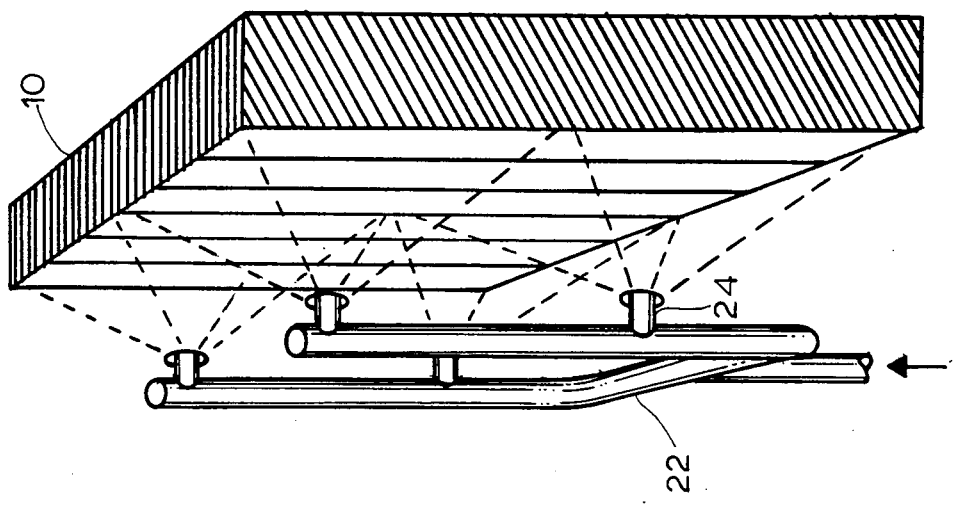
FIG. 1C is a schematic perspective view of another prior art embodiment of gas liquid contact body showing a spray cleansing arrangement for the gas inlet edge of the contact body.

Referring now to the drawing in detail, and initially to FIG. 1 thereof, a conventional gas liquid contact body 10 is illustrated formed of a plurality of sheets of corrugated material 12. The sheets 12 are corrugated in a conventional manner and formed of any known material suitable in the art for use in such apparatus. Alternate corrugated sheets are arranged in abutting relation to each other so that point contact is made between the corrugations on adjacent sheets in order to form air and liquid passages from one edge of the contact body to the other. The corrugations can be positioned at equal angles, for example as shown and disclosed in U.S. Pat. No. 3,395,903, or they can be arranged at unequal angles, as disclosed for example in U.S. Pat. No. 3,792,841.

FIG. 2 illustrates a section of a gas contact body made in accordance with the disclosure of U.S. Pat. No. 3,792,841 wherein alternate sheets have corrugations 14 formed therein inclined downwardly towards the gas inlet edge 16 of the contact body at a greater angle than the corrugations 18 of adjacent sheets. The corrugations 18 incline downwardly toward the gas outlet side 20 of the contact body at a smaller angle. As disclosed in U.S. Pat. No. 3,792,841 this arrangement tends to resist the tendency of the gas to blow the liquid out of the gas outlet side and causes more of the liquid to migrate toward the gas inlet side to cleanse the gas inlet edges of the corrugated sheets.

Figure 1B:
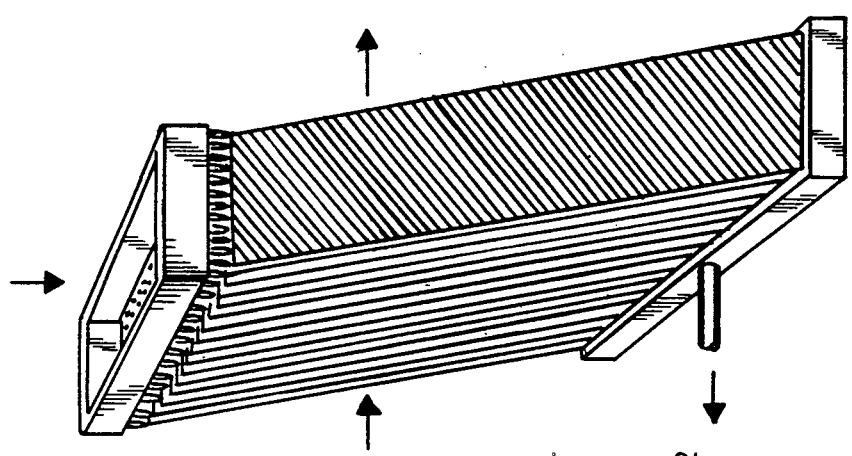
FIG. 1B is a perspective view of another embodiment of prior art gas liquid contact body, wherein the body in tilted towards the gas inlet edge to aid in cleansing the contact body.
Figure 1A:
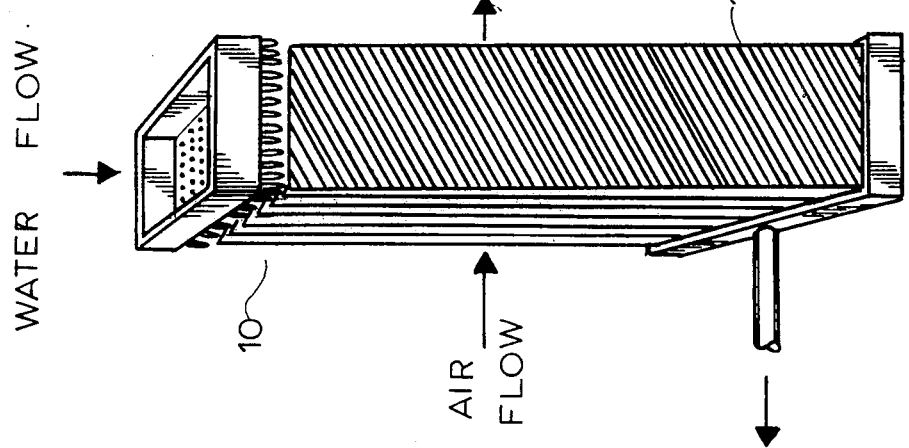
FIG. 1A is a perspective view of a conventional prior art gas liquid contact body formed of cross corrugated sheets of material.

FIG. 1B discloses the arrangement wherein the prior art contact body film material is arranged at a vertical angle, for example as shown in FIG. 1 of U.S. Pat. No. 3,792,841 and FIG. 4 of U.S. Pat. No. 3,395,903, again for the purpose of causing the liquid to migrate toward the gas inlet edge of the contact body for cleansing.

FIG. 1C discloses another prior art arrangement wherein a water supply system 22 is provided having nozzles 24 for periodically spraying the gas inlet side of the contact body 10 in order to cleanse the gas inlet edge.

As discussed above, each of these prior art arrangements have been found to be generally satisfactory, but each have their own inherent problems in terms of cleansing the gas inlet edges of the contact sheets.

FIG. 3 illustrates a gas liquid contact body 30 constructed in accordance with the present invention. Contact body 30 is formed of a plurality of sheets of corrugated fill material. A first set of sheets 32 is alternated with a second set of sheets 34 in the conventional way. The corrugations in the sheets can be positioned at equal angles, or at unequal angles, as disclosed in U.S. Pat. No. 3,792,841. Gas is supplied to the gas inlet edge or face 36 of the contact body in a conventional manner to flow through the channels 38 formed in the contact body by the cross corrugations. Liquid is supplied to the top 40 of the contact body in any convenient way. In the illustrative embodiment a perforated pan 42 is positioned above the top edge 40 of the contact body and liquid, e.g. water, is supplied to the pan and distributed along the top edge of the contact body. The liquid flows downwardly in the contact body under the influence of gravity where it is met by the cross flowing gas or air for gas cleaning, cooling, heating or humidification purposes.

In accordance with the present invention a plurality of notches 44 are formed in the gas inlet face or edge of the contact body at vertically spaced locations along the edge.

FIG. 4 illustrates in side view an enlarged view of one of the notches 44 formed in the inlet edge of the contact body. By forming the notches 44 in the gas inlet side of the contact body, liquid flowing through the contact body, as schematically illustrated, by the drops 46 in FIG. 4, will cling to the edges 48 of the notches due to surface tension. The liquid will agglomerate at these edges and follow the opening of the notch to the lowest point where it will drip off on to the lower surface of the notch and travel along the gas inlet edges of the contact body. By thus forcing additional liquid to flow along the gas inlet edges of a contact body these edges, which can become dirty and clogged, are cleansed.

The exact point where the liquid drop off of the notch can be controlled by varying the shape and size of the notch. Notches in accordance with the present invention can be used with any of the prior art contact body arrangements discussed above and illustrated in FIGS. 1A-1C, to improve the self-cleansing action of the contact body.

With this arrangement, when the liquid and gas flow are stopped, any liquid remaining in the contact body will also continue to run down the edge of the notch and continue to clean the entering face of the media. This provides an additional post operation cleaning for the contact body.

Where a porous cellulose media is used to form the contact body more liquid will remain in the contact body than for corrugated plastics, and an additional post cleaning is achieved.

As illustrated in FIG. 5, the angle at which the notches 48 are formed in the contact body can be varied from the horizontal to about 90°. Preferably the notch is formed at an acute angle to the horizontal, somewhat less than the angle of the corrugation.

The multitude depth, width and angle of the notches can be varied in manufacture, depending upon the expected intensity of dust or mineral contamination in the liquid or gas stream with which the contact body is to be used.

The notches 48 can be formed in the inlet or outlet edges of the gas contact body either before the sheets are assembled or, preferably, they can be cut into the contact body after the sheets are assembled in a pack in any convenient manner.

As illustrated in FIGS. 4 and 5, the notches are generally rectangular in shape, having an open side at the face of the gas inlet edge. However, the specific shape of the notch can be varied depending on the desired rinse pattern to be achieved with the particular contact body. For example, as shown in FIGS. 6 and 8, the notches 48 can have enlarged notch sections 50 or 52. In the embodiment of FIG. 6 the enlarged notch section 50 is an increased rectangular segment, whereas in the embodiment of FIG. 8 the enlarged notch section is formed by cutting away the upper edge of the notch 48 at an angle.

In another embodiment of the invention an obstruction plate 54 can be mounted in the notch 48 in any convenient manner, as for example by gluing or by heat sealing. This obstruction can be formed as a metal or plastic plate. The plate will prevent liquid dropping from the upper edge 48' of the notch into the channels therebelow. Liquid dripping from the upper edge 48+ will engage the obstruction and flow down the surface of the obstruction towards the air inlet edge of the contact body where it will drop down the gas inlet edge for a further cleansing action. As seen in FIG. 9, the outer edge 55 of the plate is located inwardly of the body's edge 57. Alternatively, the obstruction 54 can be perforated if desired.

In yet another embodiment of the present invention illustrated in FIG. 7, the gas outlet edge or side 56 of the contact body 30 can be provided with notches 58. In this embodiment the notches are inclined downwardly toward the gas inlet side of the contact body. Here again, the liquid in the contact body will agglomerate along the upper edge of the notch and move downwardly under the influence of gravity and surface tension toward the inner side of the contact body. The agglomerated liquid thus collected will tend to flow toward the gas inlet side increasing the amount of liquid at the gas inlet side and again enhancing the cleansing action of the liquid on the gas inlet edges of the contact sheets.

As a result of the construction of the present invention as described above an improved cleansing action is provided in the contact body making the contact body essentially self-cleaning.

Although all of the illustrative embodiments of the present invention have been described herein in detail, it is to be understood that the invention is not limited to the foregoing and that various changes and modifications may be effected therein by one skilled in the art without departing from the scope or spirit of this invention.

WHAT IS CLAIMED IS:

1. In a gas and liquid contact apparatus in which gas and liquid flow in cross flow relationship to one another, a gas and liquid contact body comprising, first and second sets of corrugated sheets having corrugations formed therein disposed in a direction transversely of the horizontal plane of the contact body, the sheets of the first set being disposed alternatively with the sheets of the second set with the corrugations of the first set crossing the corrugations of the second set, said body having a gas inlet edge and a gas outlet edge defined by the opposite edges of the sheets and said crossed corrugations defining passageways penetrating from said gas inlet edge to said gas outlet edge of said body; at least one of said gas inlet edges and said gas outlet edge having a plurality of generally channel shaped notches formed therein whereby liquid flowing through the contact body will agglomerate at said notches.

2. Apparatus as defined in claim 1 wherein said notches are formed in the gas inlet edge of said body, whereby the liquid agglomerating at said notches will flow downwardly along said gas inlet edge to clean said sheets at said gas inlet edge.

3. Apparatus as defined in claim 2 wherein said notches are formed at an acute angle to the horizontal in said edge.

4. Apparatus as defined in claim 3 wherein said notches are generally rectangular in shape having an open side at said gas inlet edge.

5. Apparatus as defined in claim 4 wherein the generally rectangular notch has an enlarged notch portion formed therein at said open side.

6. Apparatus as defined in claim 1 including an obstruction plate positioned on the lower side of each of said notches.

7. Apparatus as defined in claim 1 wherein the corrugations of said first set of sheets are inclined upwardly in the direction of gas flow, the corrugations of said second set of sheets are inclined downwardly in the direction of gas flow, and the inclination of said crossed corrugations are non-symmetrical relative to a vertical plane extending perpendicular to the direction of the gas stream as it enters said contact body, with the corrugations of said first set of sheets having a greater inclination to said horizontal plane than the corrugations in said second set of sheets whereby liquid in said contact body tends to flow toward said gas inlet edge.

8. Apparatus as defined in claim 7 wherein said notches are formed in said gas outlet edge.

9. In a gas and liquid contact apparatus in which gas and liquid flow in cross flow relationship to one another, a gas and liquid contact body comprising, a plurality of corrugated sheets having opposed first and second edges and being disposed in facially opposed and substantially parallel relationship to one another to define a plurality of intersecting and intercommunicating passages allowing the passage of gas and liquid therethrough, said first edges of said sheets defining a gas inlet edge of the contact body and said second edges defining a gas outlet edge, the corrugations in each of said sheets extending at an angle to the main direction of flow of the gas through the contact body from said gas inlet edge to said gas outlet edge with the corrugations in alternate sheets being disposed at an angle to the corrugations in the strips disposed between the alternate strips; at least one of said gas inlet edges and said gas outlet edge having a plurality of generally channel shaped notches formed therein whereby liquid flowing through the contact body will agglomerate at said notches.

10. Apparatus as defined in claim 9 wherein said notches are formed in the gas inlet edge of said body, whereby the liquid agglomerating at said notches will flow downwardly along said gas inlet edge to clean said sheets at said gas inlet edge.

11. Apparatus as defined in claim 10 wherein said notches are formed at an acute angle to the horizontal in said edge.

12. Apparatus as defined in claim 11 wherein said notches are generally rectangular in shape having an open side at said gas inlet edge.

13. Apparatus as defined in claim 12 wherein the generally rectangular notch has an enlarged notch portion formed therein at said open side.

14. Apparatus as defined in claim 9 including an obstruction plate positioned on the lower side of each of said notches.

15. Apparatus as defined in claim 9 wherein said notches are formed in said gas outlet edge.

16. In a gas and liquid contact apparatus in which gas and liquid flow in cross flow relationship to one another, a gas and liquid contact body comprising a plurality of sheets of corrugated material having first and second opposed edges with corrugations formed in said sheets extending at an angle to said edges and abutting each other at points in adjacent sheets to form through-passing channels for gas and liquid, said first and second edges defining an inlet and an outlet edge in said body; at least one of said gas inlet edges and said gas outlet edge having a plurality of generally channel shaped notches formed therein whereby liquid flowing through the contact body will agglomerate at said notches.

17. Apparatus as defined in claim 16 wherein said notches are formed in the gas inlet edge of said body, whereby the liquid agglomerating at said notches will flow downwardly along said gas inlet edge to clean said sheets at said gas inlet edge.

18. Apparatus as defined in claim 17 wherein said notches are formed at an acute angle to the horizontal in said edge.

19. Apparatus as defined in claim 18 wherein said notches are generally rectangular in shape having an open side at said gas inlet edge.

20. Apparatus as defined in claim 19 wherein the generally rectangular notch has an enlarged notch portion formed therein at said open side.

21. Apparatus as defined in claim 16 including an obstruction plate positioned on the lower side of each of said notches.

22. Apparatus as defined in claim 16 wherein said notches are formed in said gas outlet edge.

* * * * *